Aug. 10, 1965  F. B. AUBERT  3,200,214
FLOW CONTROL DEVICES
Filed Feb. 19, 1962  3 Sheets-Sheet 1
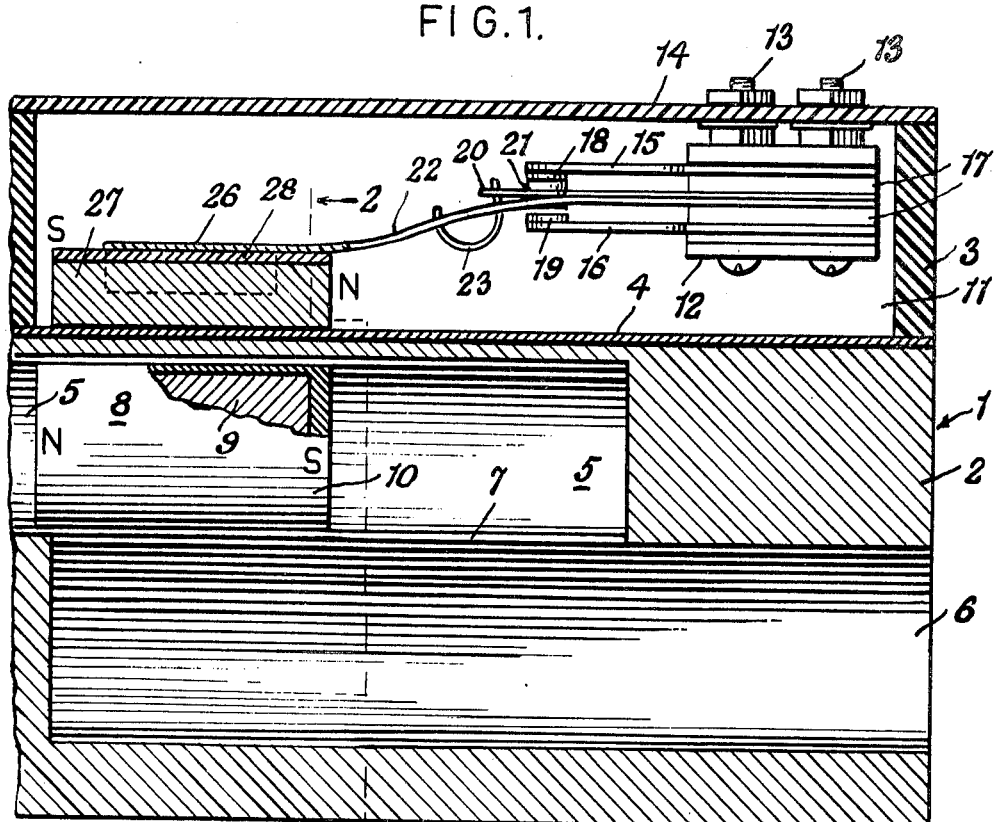
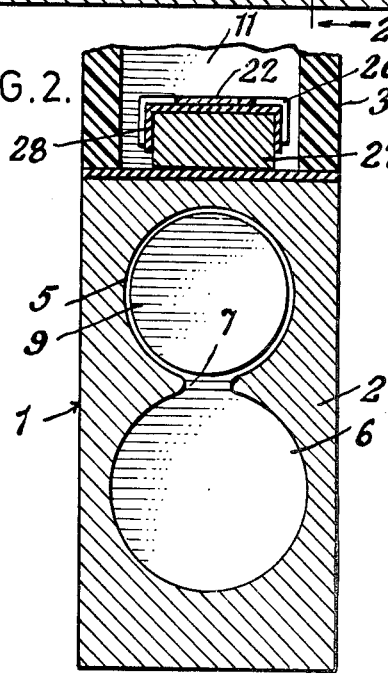
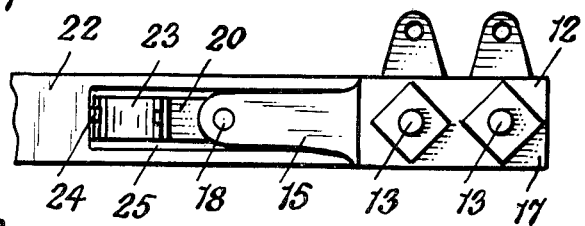
INVENTOR.
Fred B. Aubert
BY Erwin A. Gaeger
Attorney

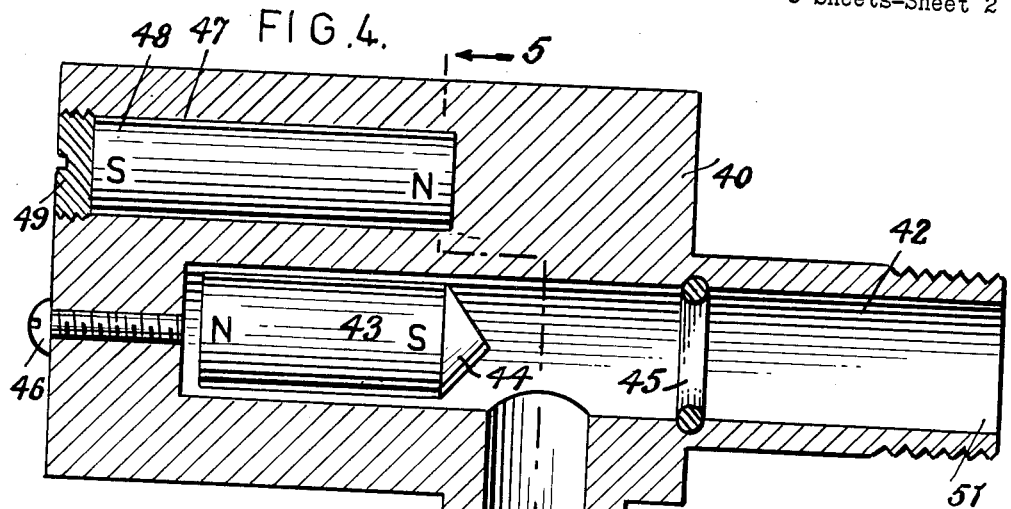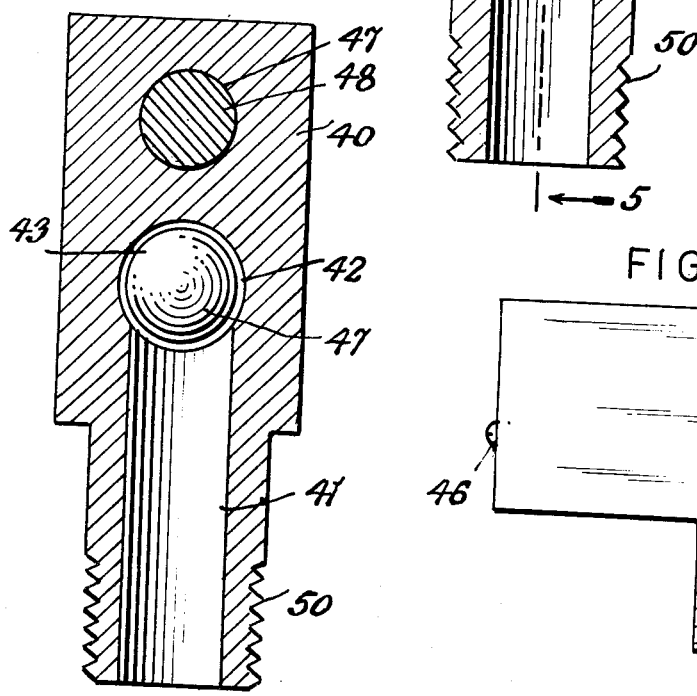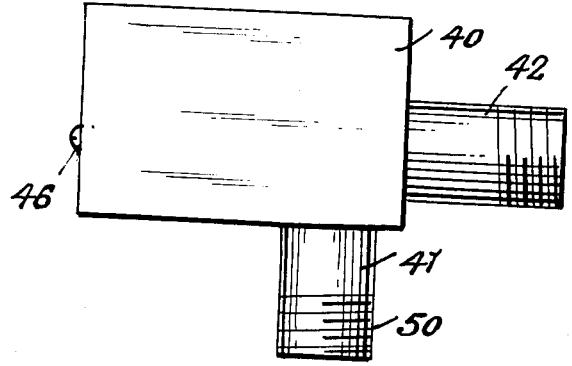

Aug. 10, 1965  F. B. AUBERT  3,200,214
FLOW CONTROL DEVICES
Filed Feb. 19, 1962  3 Sheets-Sheet 3
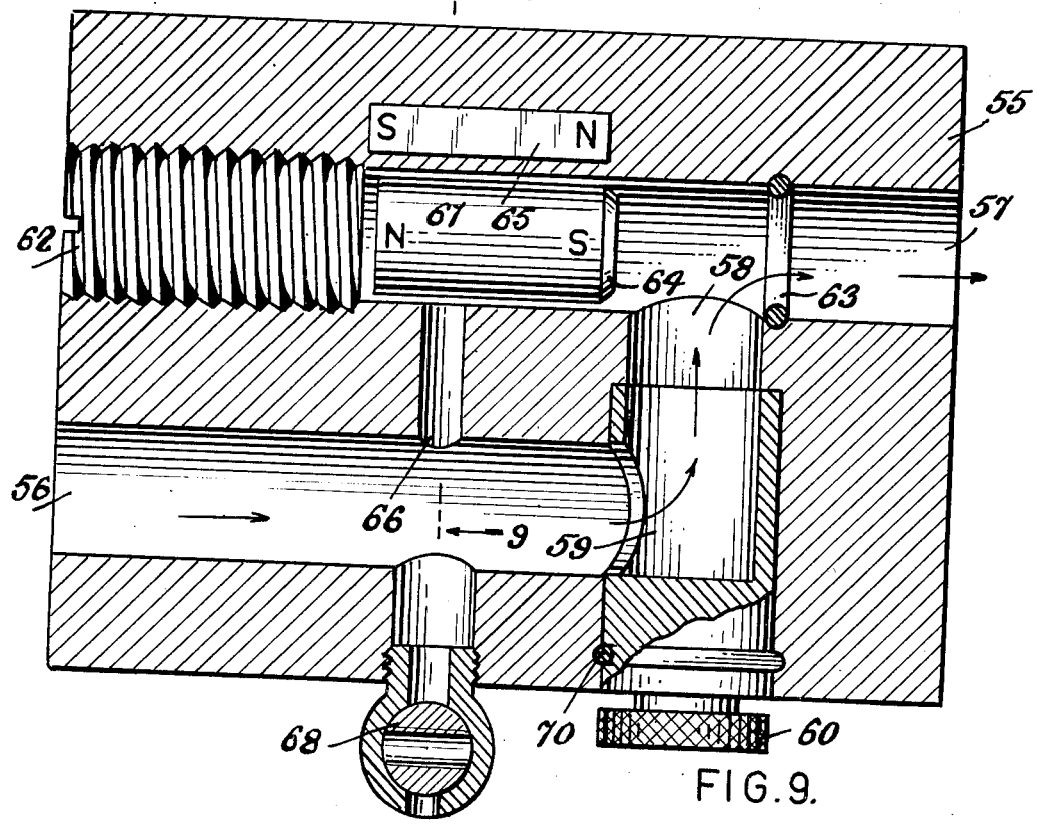
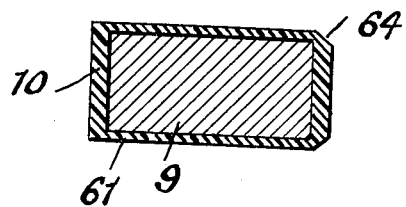
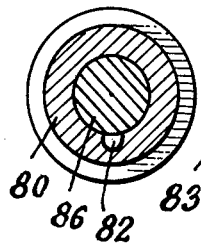
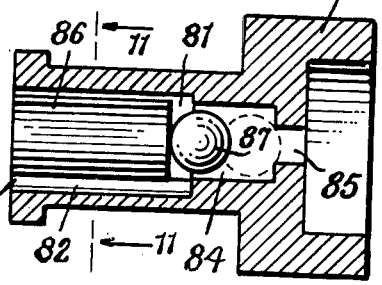
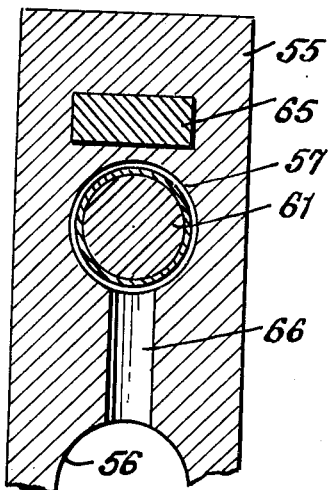
INVENTOR.
Fred B. Aubert
BY
Erwin A. Yaeger
Attorney

United States Patent Office 3,200,214
Patented Aug. 10, 1965

3,200,214
FLOW CONTROL DEVICES
Fred B. Aubert, 130 NW. 11th St., Boca Raton, Fla.
Filed Feb. 19, 1962, Ser. No. 174,008
8 Claims. (Cl. 200—81.9)

This invention relates to fluid control devices, and more particularly to a device that is responsive to change in fluid pressure or flow and is adapted among other uses for shutting off a fluid flow; for actuating switches, and for numerous other purposes.

It is an object of the invention to provide a device of this kind in which the use of springs, stuffing boxes and other elements normally employed, will be eliminated, and by which long life and positive operation will be obtained.

It is an object of the invention to provide in a device of this character, magnetic means by which a valve will be maintained in one position while permitting the valve to be moved in another direction by fluid means in opposition to the magnetic attraction exercised by the magnetic means.

More particularly, the invention contemplates the provision of a casing or housing containing communicating fluid passages, in one of which a slidable magnet-containing piston is mounted, which piston is slidable to one position where it blocks off communication between the passages, and to another position where it permits such communication, a magnet being arranged in the housing adjacent to the piston and operative to magnetically attract the piston to one of its positions, while permitting the piston to be moved to the second position in opposition to the magnetic attraction by the excess pressure of a fluid in the passage in which the piston is located.

With these and other objects to be hereinafter set forth in view, I have devised the arrangement of parts to be described and more particularly pointed out in the claims appended hereto.

In the accompanying drawings, wherein several illustrative embodiments of the invention are disclosed, FIG. 1 is a vertical sectional view of a flow control device constructed according to the invention; FIG. 2 is a sectional view, taken substantially on the line 2—2 of FIG. 1, looking in the direction of the arrows;

FIG. 3 is a top plan view of the switch; FIG. 4 is a vertical sectional view of another embodiment of the invention;

FIG. 5 is a sectional view, taken substantially on the line 5—5 of FIG. 4, looking in the direction of the arrows;

FIG. 6 is a side elevational view, on a reduced scale, of the flow control device of FIG. 4; FIG. 7 is a vertical sectional view of another embodiment of the invention;

FIG. 8 is a longitudinal sectional view of the magnetic piston; FIG. 9 is a sectional view, taken substantially on the line 9—9 of FIG. 7, looking in the direction of the arrows; FIG. 10 is a longitudinal sectional view of another embodiment of the invention, and FIG. 11 is a sectional view, taken substantially on the line 11—11 of FIG. 10, looking in the direction of the arrows.

Referring to the drawings, and more particularly to FIGS. 1 to 3 inclusive, 1 indicates generally the casing or housing of the control device. The portion thereof indicated at 2 and shown lowermost, may be composed of non-magnetic metal, while the upper portion 3 of the housing may be composed of a suitable insulating material. Said upper portion 3 includes a bottom layer or separator 4.

The lower portion 2 of the housing is formed with a fluid inlet passage 5 and also with an outlet passage 6 extending parallel thereto, the two passages being in communication by means of a slot 7 located between them.

Fluid entering the inlet passage 5 from the left of FIG. 1 from a source through suitable piping connected to the inlet passage 5, passes through the slot 7 and into and through the outlet passage 6 and through piping connected thereto to its point of use.

Valve means to be described serves to control the flow of the fluid, as will be explained. Mounted for slidable movement within the inlet passage 5 is a piston 8, the same constituting a valve operative at required times to permit of communication between the inlet and outlet passages and to allow the flow of fluid from one of the passages into the other. In FIG. 1 of the drawings, the piston 8 is shown in closed postion, or in the position in which the flow of fluid from the inlet passage to the outlet passage is cut off or interrupted.

The piston 8 consists of a cylindrical permanent magnet encased in a suitable protective covering, the magnet being indicated at 9 and the covering therefor shown at 10. The protective covering may be composed of a suitable non-corrosive plastic material.

The upper portion 3 of the housing 1 defines a compartment or chamber 11 which contains a switch 12. The switch 12 is attached by the bolts 13 to a removable cover plate 14 secured on the top of the portion 3 of the housing. The switch 12 includes a pair of similar fingers 15 and 16, separated by the insulation 17, the finger 15 being provided with a contact button 18, while a similar contact button shown at 19 is provided on the finger 16.

Disposed between the fingers 15 and 16 and insulated therefrom is a flexible blade 20, carrying a contact button 21 adapted to be brought against either of the contact buttons 18 and 19. An actuating arm 22 is in contact with the blade 20, and an arcuate leaf spring 23 has one end engaging the blade 20 near one end thereof and has its other end engaging a lug 24 (FIG. 3) at one end of a slot 25 provided in the arm 22. The leaf spring 23 normally tends to urge the button 21 in contact with the button 19 during which time the arm 22 is in an elevated position. FIG. 1 shows the arm 22 in a lowered position and the buttons 18 and 21 in contact.

At one end, the arm 22 is formed with a clamp 26 which embraces and securely holds a permanent magnet 27, the arm 22 being insulated therefrom by an insulating lining 28. The polarity of the two magnets is indicated by the letters "S" and "N" in FIG. 1.

From the foregoing, the operation of the described flow control device will be readily understood. The positioning and arrangement of the two permanent magnets relatively to one another is such that the magnetic flux between the two magnets serves to a normally maintain the piston 8 directly below the stationary magnet, as shown in FIG. 1. The magnet 27 is herein referred to as the stationary magnet to distinguish it from the slidable magnet-containing piston 8, although the magnet 27 has a raising and lowering movement since it is carried by the flexible arm 22.

When the piston 8 is directly below the magnet 27, as shown in FIG. 1, it acts to block off communication between the inlet passage 5 and the outlet passage 6. While the piston is shown, for illustrative purposes, loosely fitting within the inlet passage, it may be a snug but slidable fit therein as required. At this time, the magnet 27 is drawn down, through magnetic attraction toward the magnet in the piston 8, and brought into contact with the bottom layer 4 against the effect of the spring 23. When the two magnets 9 and 27 are in the positions shown, it will be noted that the arm 22 is held down and the button 21 is in contact with the upper button 18. The switch is, of course, connected in an electrical circuit for the control of any apparatus in which a shut-off is required when failure of the proper flow of fluid through the control device is interrupted. Thus, in the position of the parts as shown in FIG. 1, it can be assumed that the flow of fluid from the inlet passage to the outlet passage is prevented by the piston 8 which is maintained in its blocking-off position by its magnetic co-operation with the stationary magnet 27.

In the normal flow of fluid through the control device under predetermined pressure, the fluid passes through the inlet passage 5 from the left and its pressure upon the left end of the piston 8 is effective to move the piston toward the right, thus uncovering the slot 7 and establishing communication between the inlet and outlet passages and allowing the fluid to pass into and flow out of the outlet passage. When the piston 8 is moved in the manner above described, the flux field between the two magnets 9 and 27 changes sufficiently to allow the spring 23 to become effective to elevate the arm 22 and cause the blade 20 to be deflected in a manner to establish contact between its button 21 and the button 19 to thereby close circuit to the device or apparatus controlled by the switch. As long as a predetermined flow of liquid through the device takes place, communication between the inlet and outlet passages will be maintained and the flow of the liquid will uninterruptedly occur.

When for any reason, the flow ceases or materially reduces in volume, there will remain enough magnetic attraction between the magnets 9 and 27 to cause the piston 8 to be moved to the left, or to the position shown in FIG. 1, wherein it will assume the position where it prevents communication between the inlet passage 5 and the outlet passage 6, at the same time moving the switch-actuating arm 22 to the position of FIG. 1 to shut off the current flow or otherwise effect the electric circuit of which the switch 12 forms a part.

In the embodiment of the invention shown in FIGS. 4 to 6 inclusive, a housing is shown at 40, the same having an inlet 41 through which the fluid is forced into an outlet passage 42 disposed at right angles to the inlet 41. Contained within the outlet passage 42 is a slidable piston 43 constructed substantially similar to the piston 8. That is to say, it consists of a permanent magnet 9 contained within a non-magnetic protective covering 10. The piston 43 is provided with a conical end 44 which is adapted, when the piston 43 is in the position of closing off the inlet 41, to seat against an O-ring 45 suitably positioned in the outlet passage 42. A pressure-relief screw 46 is fitted in one end of the outlet passage 42.

Provided in the housing 40 and located adjacent to the outlet passage 42, is a cylindrical recess 47 in which a permanent magnet 48 is stationarily positioned, said magnet being maintained in the recess 47 by means of a threaded plug 49.

By means of piping attached to the threaded end 50 of the inlet 41, a flow of fluid is injected into the outlet passage 42 to be forced therethrough out of the end 51 thereof and conveyed to a point of use. As long as the flow continues at a predetermined level, the attraction between the magnet 48 and the magnet contained within the piston 43 will be sufficient to maintain the piston 43 in its retracted position toward the left as shown in FIG. 4. However, if for any reason fluid flow should increase within the housing 1, due perhaps to a rupture of the output pipe line or an inadvertent opening of a valve leading from the output line, the fluid then entering passage 42 from passage 41 will develop a venturi effect which will move the piston 43 forward toward the valve seat 45. When the forward motion of piston 43 obstructs the flow of fluid from passage 41 to passage 42, pressure will increase in passage 41 which will in turn force fluid behind piston 43. When the conical end 44 of piston 43 makes contact with valve seat 45, the outlet passage becomes blocked off and the full pressure present in passage 41 holds piston 43 in a closed position. To reset the valve, the fluid supply to passage 41 must be blocked off and any trapped pressure relieved by the use of the relief screw 46.

In the embodiment of the invention shown in FIGS. 7 to 9 inclusive, the housing of the control device is shown at 55. The housing is composed of non-magnetic material and is provided with an inlet passage 56 through which fluid flows in the direction of the arrows in FIG. 7. The inlet passage 56 connects with a substantially parallel outlet passage 57 by means of a connecting passage 58.

Rotatively mounted in the connecting passage 58 is a plug valve 59 maintained in place by the retaining ring 70, and which by manual rotation of the knob 60 can be caused to provide for controlled or metered flow of the fluid from the inlet passage 56 into and out of the outlet passage 57 as indicated by the arrows, or the valve can be turned to close off or interrupt the communication between the passages 56 and 57. Mounted for slidable movement in the outlet passage 57 is a piston 61, which consists of a permanent magnet 9 encased in a protective covering 10. Said piston is confined within the outlet passage 57 between a threaded plug 62, fitted in one end of the passage, and which permits of easy removal or replacement of the piston, and an O-ring 63 fitted in the outlet passage 57. The piston 61 may be slightly beveled at one end, as shown at 64, to enable it to establish a sealing contact with the O-ring.

Fixedly mounted in the housing 1, relatively close to the outlet passage 57 is a permanent magnet 65 so positioned that its magnetic attraction for the magnet 9 within the piston 61 normally maintains the piston in a retracted position, or that shown in FIG. 7 and to the left of the connecting passage 58.

When the parts of the device are in the positions shown in FIG. 7, a flow of fluid entering the inlet passage 56 and proceeding therethrough in a predetermined volume, will be forced through valve 59, through the connecting passage 58 and out through the outlet passage 57. At this time the magnetic attraction between the fixed magnet 65 and the magnet 9 within the piston 61 serves to hold the piston in the retracted position shown in FIG. 7 wherein it closes off an overload orifice 66 while permitting the free flow of the fluid from the inlet to the outlet passage.

When an overload occurs, the fluid entering through the inlet passage 56 will be forced up through orifice 66 as well as the fluid passing through the valve 57, and such fluid will then be forced between the piston 61 and the surrounding wall of the outlet passage. When the force of this flow movement overcomes the magnetic attraction between the magnet 65 and the magnet in the piston 61, the piston will then be moved toward the right and will have its bevelled end 64 seated against the O-ring 63 to thereby close off the outlet passage. The movement of the piston 61 toward the right to seating position, open the orifice 66 and establish communication therethrough between the inlet and outlet passages, and the fluid passing up through said orifice will exert its pressure behind the piston and will serve to maintain the piston in its seated position. The piston can be restored to its retracted position shown in FIG. 7 by opening the re-set valve shown at 68, which will relieve the pressure behind the piston and enable the magnet 65 to retract it.

In FIGS. 10 and 11 is shown a housing 80 having a fluid passage 81, provided with a groove 82 to facilitate the passage of fluid, entering through the inlet 83, past the fixed magnet 86 located in the passage 81, and to flow through the reduced-diameter part 84 of the passage and out of the outlet opening 85. Confined in the part 84 of the passage, between the end of the magnet 86 and the outlet 85, is a magnetically-attractive ball or sphere 87 that is normally magnetically attracted by the magnet and magnetically held thereby in a position away from the outlet opening 85. While the fluid is at a predetermined pressure, it will flow past the magnet 86 and past the ball to then flow out of the outlet opening 85. However, when the fluid pressure exceeds a certain level and sufficient to overcome the magnetic influence of the magnet 86 on the ball 87, the fluid will then act to force the ball away from the magnet and cause it to seat over the outlet opening 85 as shown in dotted lines in FIG. 10, and prevent the flow of fluid therethrough. As long as the fluid pressure on the ball remains sufficient to overcome the attraction of the magnet on the ball, the ball will close the outlet opening 85, but will be immediately drawn away from the same as soon as a drop in the fluid pressure takes place.

While I have herein shown and described several embodiments of the invention, it will be obvious that various modifications can be made in the same without departing from the spirit of the invention. The disposition, size and shape of the magnets, as well as the spacing or separation of the same may be varied and other modifications made as is comprehended by the claims appended hereto.

What I claim is:

1. A fluid control device comprising, a housing, a fluid inlet passage therein, a fluid outlet passage in communication therewith, a movable valve normally interrupting communication between the passages, said valve being magnetically attractive, a magnet disposed in the housing and arranged alongside of the valve and exerting a magnetic influence on the valve to normally maintain the valve in closing position, the valve being capable of displacement in opposition to the magnetic attraction, to open position by predetermined excess of fluid pressure through the inlet passage and returnable to closed position by said magnetic influence after the excess of fluid pressure ceases, and switching means controlled by movements of the valve.

2. A fluid control device as provided for in claim 1, wherein the magnet is swingably carried and the valve is slidably relatively to the magnet, the valve being of piston form and containing a permanent magnet, the switch including a movable contact-carrying arm, said arm being attached to the swingable magnet.

3. A fluid control device comprising, a housing, a switch, an actuating member therefor, a swingable magnet to which said actuating member is attached, a slidable magnet constituting a valve, an inlet passage in which said valve is slidably mounted, an outlet passage communicating with the inlet passage and normally closed by the valve, the valve being normally maintained in its closed position by mutual magnetic attraction between it and the swingable magnet, said valve being capable of being moved to an open position establishing communication between the passages upon the imposition of excess fluid pressure imposed upon it by fluid passing through the inlet passage, the positions of the swingable magnet and the valve while the valve is in an open position being such that the magnetic influence of the magnet on the valve is sufficient to move the valve to its closed position when the imposition of excess fluid pressure ceases on the valve.

4. A fluid control device comprising, a housing, a pair of magnets mounted therein, one of the magnets being swingably mounted and the second magnet being slidable, the magnets being located in side-by-side position, the housing having communicating fluid inlet and outlet passages that are normally prevented from communication by the slidable magnet that is maintained in outlet-closing position by the mutual magnetic attraction between the magnets, the slidable magnet being displaceable to outlet-opening position by the imposition of excess fluid pressure imposed on it in opposition to the magnetic attraction, the slidable magnet and the swingable magnet being so positioned that when the slidable magnet is in open position the magnetic influence between them is sufficient to bring the slidable magnet to outlet-closing position as soon as the excess pressure is no longer imposed on the slidable magnet.

5. In a fluid control device, a housing having an inlet passage, an outlet passage in communication therewith, a slidable piston containing a magnet disposed between the passages and normally blocking communication between the same, a movable second magnet located within the housing and adjacent to the slidable magnet and side-by-side therewith and magnetically co-acting therewith to normally maintain the slidable magnet in position to block the outlet passage, the slidable magnet being displaceable by fluid passing through the inlet passage, the pressure of such fluid moving the slidable magnet to a position to permit communication between the passages and allow the fluid to pass from the inlet passage through the outlet passage, the two magnets being so positioned that after the slidable magnet is displaced by the fluid, the slidable magnet will be moved back to its blocking position by the magnetic influence between the two magnets as soon as a reduction in the pressure of the fluid occurs against the slidable magnet, said slidable magnet being in the form of a piston, the second magnet extending in parallelism to the slidable magnet, the second magnet being movably mounted, a switch contact arm carried by the second magnet, and switch contacts with which said arm cooperates according to the position of the contact arm.

6. A fluid control device comprising, a housing, an inlet passage therein, an outlet passage communicating with the inlet passage, a piston slidable in the inlet passage and normally positioned to prevent communication between the passages, said piston containing a magnet, a magnet contained in the housing and located along one side of the piston and arranged for magnetic co-operation with the magnet in the piston to thereby normally locate the piston in passage-closing position, the piston being capable of displacement under fluid pressure in excess of a given amount and in opposition to the magnetic attraction between the magnets, to thereby establish communication between the passages, the magnet in the housing being swingably mounted, and a switch-actuating member carried by the latter magnet and effective to effect an electric circuit by movement of said magnet, the magnet in the housing and the piston being so relatively positioned that when the piston is in passage-opening position, sufficient magnetic influence exists between the magnets to magnetically move the piston to passage-closing position as soon as the excess of fluid pressure ends against the piston.

7. A fluid control device comprising, two fluid passages, a magnetic piston arranged in one of the passages and movable to close off communication between the passages or to permit communication between the same, a magnet arranged adjacent to the piston and in side-by-side relation thereto, means operative on the magnet to move the same in a direction transversely of the piston and away from the same when a change in flux between the magnet and piston occurs by movement of the piston away from the magnet, the magnet being adapted to magnetically maintain the piston in one of its positions in the absence of sufficient force imposed on the piston to move it away from the magnet, the piston being movable in a direction away from the magnet and to a second position by fluid pressure and being returnable to its first position by magnetic force between it and the magnet on lowering of the fluid pressure.

8. A fluid control device comprising, a housing having communicating passages, a sliding piston valve for interrupting communication between said passages when said valve is under fluid pressure below a predetermined level, said piston valve incorporating a permanent magnet, a second magnet installed in the housing in side-by-side relation to the piston valve and swingably operative to magnetically attract the piston and hold the same in a position in which the piston valve interrupts communication between the passages while fluid pressure through the housing is maintained below a predetermined level, means for moving the second magnet away from the piston valve upon displacement of said piston valve by fluid pressure above a certain level, the relative positions of the second magnet and the piston valve being such that sufficient magnetic force is existent between the said magnet and said valve to magnetically return the valve to blocking position on reduction of the fluid pressure through the housing.

References Cited by the Examiner
UNITED STATES PATENTS

| | | | |
|---|---|---|---|
| 2,012,153 | 8/35 | Bates | 200—98 |
| 2,569,316 | 9/51 | Jerman | 251—65 XR |
| 2,576,168 | 11/51 | Allen | 251—65 XR |
| 2,589,188 | 3/52 | Craene et al. | 251—65 |
| 2,597,952 | 5/52 | Rosenlund | 251—65 XR |
| 2,667,895 | 2/54 | Pool | 251—65 XR |
| 2,700,395 | 1/55 | Young | 137—529 XR |
| 3,012,512 | 12/61 | Shaw | 251—65 XR |

FOREIGN PATENTS

| | | |
|---|---|---|
| 192,591 | 10/57 | Austria. |
| 653,747 | 5/51 | Great Britain. |

ISADOR WEIL, *Primary Examiner.*

MARTIN P. SCHWADRON, WILLIAM F. O'DEA, *Examiners.*